(12) United States Patent
Jones et al.

(10) Patent No.: US 6,793,708 B1
(45) Date of Patent: Sep. 21, 2004

(54) SLAG COMPOSITION

(76) Inventors: Jeremy A. T. Jones, 5813 NE. Ruby Ct., Lees Summit, MO (US) 64064; William J. West, 380 Fairway Dr., Warren, OH (US) 44483; Frank L. Kemeny, 4994 Oak Hill Dr., Lewiston, NY (US) 14092

( * ) Notice: Subject to any disclaimer, the term of this patent is extended or adjusted under 35 U.S.C. 154(b) by 136 days.

(21) Appl. No.: 10/271,083

(22) Filed: Oct. 15, 2002

Related U.S. Application Data

(60) Provisional application No. 60/329,908, filed on Oct. 16, 2001.

(51) Int. Cl.$^7$ ............................................. C21C 7/076

(52) U.S. Cl. .......................................... 75/312; 75/561

(58) Field of Search .................................. 75/312, 561

(56) References Cited

U.S. PATENT DOCUMENTS

| | | |
|---|---|---|
| 4,447,265 A | 5/1984 | Schwer |
| 4,473,397 A | 9/1984 | Bleeck et al. |
| 4,528,035 A | 7/1985 | Simpson, Jr. et al. |
| 5,279,639 A | 1/1994 | Kemeny et al. |
| 6,267,798 B1 * | 7/2001 | Kemeny et al. ............. 75/312 |
| 6,558,614 B1 * | 5/2003 | Fritz ........................... 266/44 |

* cited by examiner

*Primary Examiner*—Melvyn Andrews
(74) *Attorney, Agent, or Firm*—Howard J. Greenwald P.C.

(57) ABSTRACT

A slag composition containing from about 85 to about 99 weight percent of steelmaking slag and from about 1 to about 15 weight percent of a foaming additive. The steelmaking slag is at a temperature of from about 2500 to about 3100 degrees Fahrenheit. The foaming additive contains from about 20 to about 80 weight percent of a source of elemental carbon, from about 5 to about 80 weight percent of calcium carbide, and from about 25 to about 75 weight percent of anoxide compound. The weight ratio of the source of elemental carbon to the calcium carbide is at least 2.

13 Claims, 1 Drawing Sheet

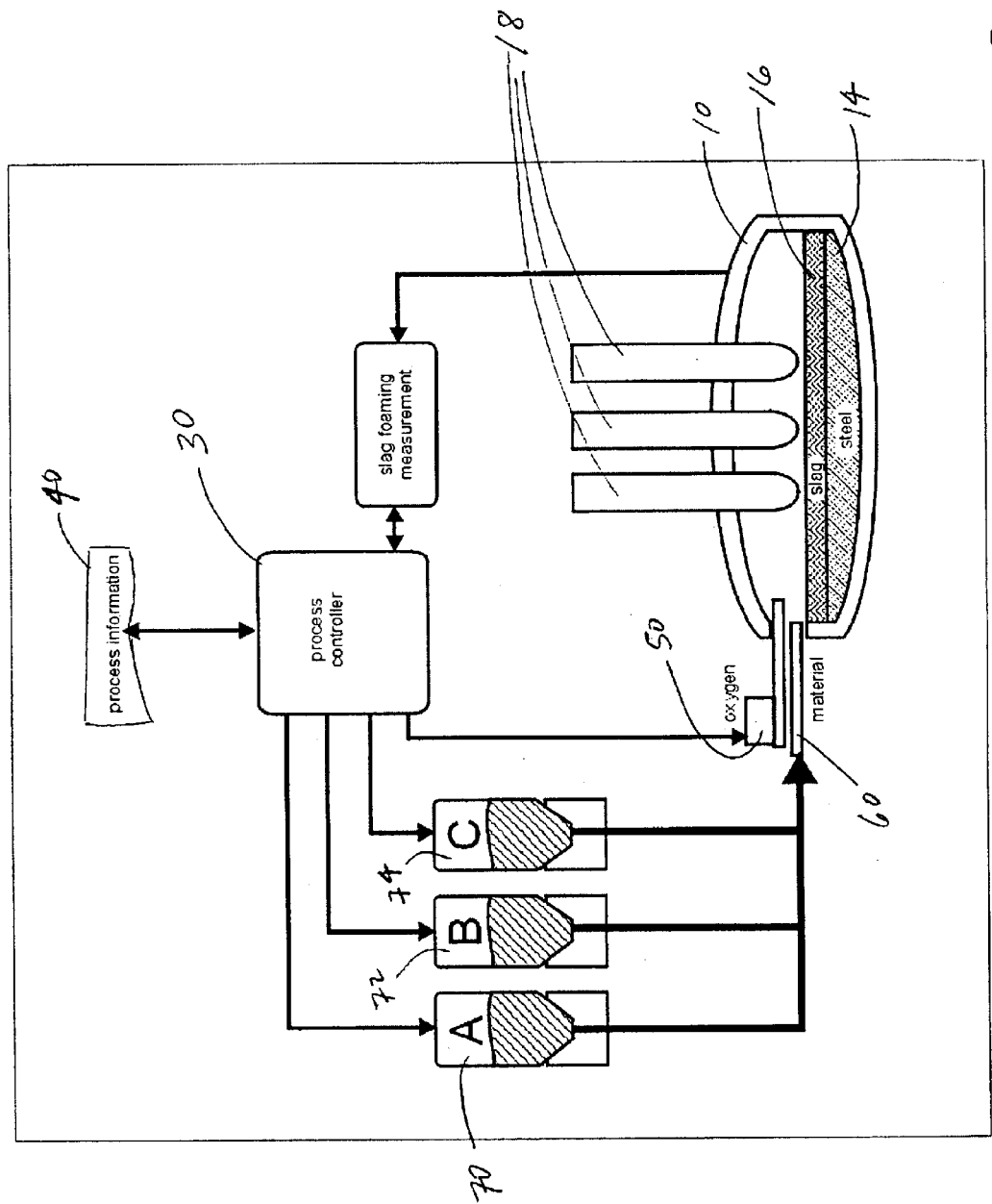

SLAG COMPOSITION

CROSS REFERENCE TO RELATED PATENT APPLICATION

This patent application claims priority based upon applicants' provisional patent application 60/329,908, filed on Oct. 16, 2001.

FIELD OF THE INVENTION

A slag composition comprised of from about 85 to about 99 weight percent of steelmaking slag and from about 1 to about 15 weight percent of a foaming additive. The foaming additive is comprised of from about 20 to about 80 weight percent of a source of elemental carbon, from about 5 to about 80 weight percent of calcium carbide, and from about 25 to about 75 weight percent of an oxide compound. The weight/weight ratio of the source of elemental carbon/calcium carbide is at least 2.

BACKGROUND OF THE INVENTION

The present invention is directed to providing an optimal composition for achieving desired properties in a steelmaking slag within an electric arc furnace, including the creation of appropriate basicity and chemistry for optimal foaming at each stage of the process, as well as a method and system for accomplishing the optimal composition.

In electric arc melting of steel the energy efficiency and overall cost is greatly improved by the creation of a basic foamy slag within the furnace. Foaming of the slag in order to engulf the electric arc is well known in the art, and is described, for example, in U.S. Pat. No. 4,447,265 and in U.S. Pat. No. 4,528,035. The procedures described involve the injection of carbonaceous material into the furnace slag to cause carbon monoxide gas evolution, and the escaping gas causes the slag to effervesce or foam. As a result of the effervescence or foaming, the slag is increased in its volume, engulfing the electric arcs and improving electrical and heat transfer efficiency.

In U.S. Pat. No. 4,473,397, the inventors discuss the injection of calcium carbide into a steel making convertor to decrease the amount of slag foaming. Contrary to that finding, U.S. Pat. No. 5,279,639 teaches that the introduction of calcium carbide into a slag with high oxygen potential causes slag foaming. Neither patent teaches the use of calcium carbide to create a foamy slag in an electric arc steel melting furnace.

In U.S. Pat. No. 5,279,639 the use of calcium carbide as the reductant in ladle slag treatment is discussed. The invention discloses that calcium carbide is also an effective slag foaming agent due to the release of carbon monoxide during reaction in the slag. This reaction product provides stirring and foaming of the slag with the benefits of mixing, enhanced reaction rates and arc stability, as described in the patent. It was noted that the release of gas was sustained over a period of time, and that foaming was sometimes considered excessive. The furnace slag could benefit from the sustained foaming observed during the use of calcium carbide. The present invention teaches a system and method to use calcium carbide and other materials to advantage in the creation of optimum foamy slag conditions in the electric arc melting furnace.

As described in the prior art, the use of injected oxygen aids in the production of carbon monoxide gas. Also described in the prior art, calcium oxide is sometimes injected along with the carbon and the oxygen in order to raise the slag basicity and stabilize the foam that is created. In addition, other cost benefits are derived such as reduced refractory lining wear, higher productivity, reduced graphite electrode consumption, and increased yield of iron units from the melted scrap. Foamy slag practice is arguably one of the greatest improvements to electric arc steel melting technology of the 20th century.

In the steel melting process, the chemical and physical properties of the slag can influence the economics of production and the quality of the final steel product. The slag is formed from several sources, possibly including added calcium and magnesium oxides, eroded refractory, residual slag from a previous steel batch, alloying elements that are present in the scrap charge that are oxidized during the steelmaking process, gangue materials that are present in the charge carbon or injected carbon materials, and entrained oxides that coat the scrap charge or are otherwise introduced into the process. Since the amount of these contributors to the slag may vary considerably from batch to batch, the chemistry of the slag on top of the steel may be quite variable, and hence the ability to cause and maintain a stable foamy slag may also be quite variable. As a result, the current art of slag foaming in the electric arc steel melting furnace is highly variable in its effectiveness.

The ideal chemistry for optimum slag foaming is different at different times in the process. Initially, while the iron oxide content of the slag is low, a lower basicity slag is required. Conversely, as the process progresses and iron oxide content of the slag increases, a higher basicity slag is better for a sustained foamy slag. Current technology, however, does not recognize or provide for this variance. Several characteristics are required in the furnace slag to optimize slag foaming at all stages of the process:

1. Slag with both fluid and solid components in appropriate ratio
2. Adequate viscosity to retain sufficient fraction of gas for a stable foam
3. Adequate sources of carbon and oxygen to sustain the foam
4. Control of FeO content of the slag by independent control of oxygen and carbon injection rates
5. Gas generation rate sufficient for foaming but not enough to cause foam collapse
6. Non-corrosive to refractory lining
7. Minimum slag weight that can accomplish required slag volume and chemistry Again, the current state of the art does not consistently and reproducibly provide a foamy slag on each steel batch of steel that optimally meets the above criteria. The amount and composition of indigenous slag components are not accurately known, and the intentionally added components are typically designed around an average starting slag composition and an average desired final slag composition. This inaccuracy is particularly troublesome when attempting to create an optimum foamy slag in the furnace.

SUMMARY OF THE INVENTION

In accordance with this invention, there is provided a slag composition comprised of from about 85 to about 99 weight percent of steelmaking slag and from about 1 to about 15 weight percent of a foaming additive. The foaming additive is comprised of from about 20 to about 80 weight percent of a source of elemental carbon, from about 5 to about 80 weight percent of calcium carbide, and from about 25 to about 75 weight percent of an oxide compound. The weight/ weight ratio of the source of elemental carbon/calcium carbide is at least 2.

In accordance with another aspect of the present invention, there is provided a method of forming foam in the slag produced during electric arc furnace steelmaking comprising the addition to said slag of an effective amount of a composition comprising from about 20 to about 80 wt % of a carbon source, from about 5 to 80% calcium carbide, the remainder consisting of a mixture selected from the group lime, dolomite, limestone, dolomitic limestone, complex low melting point oxide, byproduct slag, steelmaking slag, and baghouse dust.

In accordance with yet another aspect of the present invention, there is provided a method of creating and maintaining a foamy slag during the earlier stage of the electric arc furnace steelmaking cycle by concurrent addition of a carbon source, an oxygen source, and a complex oxide of melting point less than 2800° Fahrenheit (° F.).

In accordance with a further aspect of the present invention, there is provided a method of creating and maintaining a foamy slag during the later stage of the electric arc furnace steelmaking cycle by concurrent addition of a carbon source, an oxygen source, and a source of material that reacts endothermicly within the slag and concurrently increases slag basicity.

One aspect of the invention is based on the discovery that the monitoring and control of one or more of several key characteristics related to foamy slag formation leads to more consistent and optimal slag conditions. This discovery avoids problems that arise in conventional processes and results in improved control of chemical and physical properties of the slag that can favorably influence the economics of production and the quality of the final steel product. Hence, an object of the present invention is to provide an optimal method and composition for achieving the desired properties in a steelmaking slag within the electric arc furnace, including the creation of appropriate basicity and chemistry for optimal foaming at each stage of the process. The compositions are designed to combine materials such that the gas formation rate is optimal for sustained efficient foaming at minimal cost. The following classes of materials are used to advantage:

1. Source of oxygen: selected from materials containing iron oxide, or gas containing oxygen, combinations thereof.

2. Source of carbon: selected from carbonaceous materials normally used in metallurgical processes including calcium carbide, carbon, petroleum coke, graphite, coal, lignite, anthracite, coke, metal carbides, and mixtures thereof.

3. Source of slag basicity raiser: selected from calcium carbide, calcium oxide containing materials, calcium carbonate containing materials, magnesium oxide containing materials, magnesium carbonate containing materials, baghouse dust, or mixtures thereof.

4. Source of slag fluidizer selected from silicon oxide containing materials, low melting point complex oxides, waste oxide materials, recycled steelmaking slag, or mixtures thereof.

The present invention is, therefore, intended to make effective use of available real-time and historical information to apply the required reagents in optimum ratios and at optimum addition rates during the melting process for each batch of steel. Depending upon specific conditions at each electric arc steel melting installation, it may be appropriate to manufacture in-situ a slag in more than one step through more than one addition of mixtures of the above materials.

It is a further object of the present invention to optimize the choice of injected agents at each phase of the steel making process to create the desired foamy slag effect reproducibly under all conditions and at least cost. As such, the continuous measurement of slag foaming level is required, as well as a real time knowledge of the stage of the electric arc furnace steel making process. The feed materials to the furnace are also monitored and the melt in slag chemistry is estimated. Thus, the adjustment to this chemistry can be made by correct choice of injected materials in order to start foaming early.

One disadvantage of injected carbon or carbonaceous materials as slag foaming agents is that they are not efficient. Calcium carbide is a more efficient source of carbon for slag foaming, since its reaction rate is slower and it is better wetted by steelmaking slag. On the other hand, calcium carbide is more expensive than injectable carbon. Hence, an optimal blend of calcium carbide and carbon proves will be cost effective while increasing foaming efficiency. The present invention is directed to the optimal composition and a process for achieving and maintaining that composition during the steel making process. Furthermore, calcium carbide is a source of calcium which can reduce the iron oxide content of the slag, thereby improving steel yield. The released calcium can also be effective in sulfur and phosphorus removal. These effects make it particularly attractive to use a higher fraction of calcium carbide near the end of the steel making process just prior to tapping.

BRIEF DESCRIPTION OF THE DRAWINGS

FIG. 1 is a schematic representation of aspects of a system capable of controlling a slag forming process in an electric arc furnace in accordance with the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

For a general understanding of the present invention, reference is made to the drawings. In the drawings, like reference numerals have been used throughout to designate identical elements. In describing the present invention, the following term(s) have been used in the description.

The term "data" includes data existing in any physical form, and includes data that are transitory or are being stored or transmitted. For example, data could exist as electromagnetic or other transmitted signals or as signals stored in electronic, magnetic, or other form.

A "data processor" or "processor" is any component or system that can process data, and may include one or more central processing units or other computers or processing components. A processor performs an operation or a function "automatically" when it performs the operation or function independent of concurrent human control.

As noted above, the principal slag foaming agent in an electric arc steelmaking process is the reaction of carbon with oxygen to form carbon monoxide. The carbon monoxide is buoyant and rises through the slag until it escapes the surface. This process causes the slag volume to increase since it contains a gas void fraction. In a preferred process slag foaming environment, the carbon oxide bubbles are small and numerous, allowing the gas fraction of the slag to increase substantially. Also, the reactions are preferably endothermic, or at least not exothermic. A higher liquid slag viscosity will tend to retain the gas longer prior to allowing it to escape. An exothermic reaction would tend to decrease slag viscosity, thereby de-stabilizing the foam. Thus, the reaction of iron oxide with carbon, which is endothermic in the steelmaking environment, is more desirable than, for example, the exothermic reaction between carbon and oxygen gas.

The process of slag foaming requires that a significant ratio of the slag be liquid. In the beginning of the steelmaking process, the "slag" materials are not sufficiently liquid, so injection of oxygen and carbon does not cause effective foaming. This is remedied in the present invention by injecting slag-fluidizing material into the furnace along with the carbon source to aid slag foaming. The amount of slag fluidizer required is only that sufficient to create enough liquid slag fraction to sustain the foaming effect. The efficacy of the fluidizer injection can be measured in real time by any one of the slag foaming efficiency measures available in the art, such as primary electric current stability measurement, arc noise measurement, or the like.

As steel making progresses, the iron oxide content of the slag typically increases. This has the effect of decreasing slag viscosity. It is understood that carbon injection rates must, therefore, be high to cause effective slag foaming in this stage. In the present invention, a slag basicity raiser is injected along with the carbon in this stage of steelmaking, thereby increasing steel viscosity and improving foaming efficiency. Temperature also typically increases during this later stage of the process, acting to decrease slag viscosity. The addition of basicity raiser materials, particularly those that react endothermically within the slag, will act to raise slag viscosity and stabilize foaming. The solid particles also act to nucleate gas reaction products, and further improve slag foaming. Various agents, for example dolomitic limestone, can achieve these multiple effects at this stage of the process. The dolomitic limestone endothermically releases carbon dioxide. The dolomite reaction product does not melt at steelmaking temperatures. Hence, the solid particles are ideal nucleation sites. The partial dissolution of the dolomite will increase slag basicity. All these effects improve conditions for slag foaming at this later stage of electric arc furnace steelmaking. The efficacy of the injected agents can be measured in real time by any one of the slag foaming efficiency measures available in the art, such as primary electric current stability measurement, arc noise measurement, or the like.

The present invention is particularly directed to the optimization of the choice of injected agents at one or more phases of the steel making process, in order to reproducibly create the desired foamy slag effect under all conditions and at least cost. As such, the continuous measurement of slag foaming level is required, as well as a real time knowledge of the stage of the electric arc furnace steel making process. Information relative to the stage of the of the electric arc furnace steel making process may be determined relative to the total amount of energy or power applied to the system (e.g., total electrical and/or chemical energy). The feed materials to the furnace are also monitored and the melt in slag chemistry is estimated. Thus, the adjustment to this chemistry to start foaming early can be made by correct choice of injected materials.

A method for injection of the slag foaming composition is made available, preferably controlled by integrated control system including one or more processors. The integrated control system receives, as inputs, continuous information regarding the state of slag foaming in the furnace. Such inputs are provided by either monitoring of noise, vibrations, or electrical parameters of the electric arc melting furnace. In addition, the integrated control system receives information from upper-level plant and melt control systems (Level 2), or from the plant programmable logic controller (PLC) (Level 1.5) or other source, regarding the details of the present batch of steel, including at least: heat number; grade; and charge materials.

Referring now to the Figure, the main vessel is an Electric Arc Furnace 10 used to melt steel scrap and make a liquid steel product. The bottom layer 14 within the furnace is the steel and the top layer 16 is the slag. In the embodiment depicted, three vertical, graphite electrodes 18 are used to generate an arc in response to electrical power applied thereto. The slag is the layer to which the additions that are the object of this invention are made. The slag is made to foam and increase in volume, thereby engulfing the electric arcs that are generated at the lower ends of the electrodes.

The process controller 30 is a computer processor or other automated data gathering, communicating, calculating and supervisory or advisory system used to optimize the slag foaming process. Such a controller is preferably programmable, and has associated memory for storing such programs as well as performance data, input data and other information associated with control of the process. It will be further appreciated that the controller may be programmed as an "intelligent" device that is able to continuously monitor and control the slag forming process optimization based upon the program. Controller 30 collects data and uses it to automatically estimate the conditions within the furnace at any given time. Of particular significance is the predicted slag chemistry in the furnace based on the added charge materials.

The slag foaming measurement is accomplished by monitoring electric arc furnace vibration, electrical parameters of arc generation (e.g., voltage, current, impedance), acoustic noise generated by the furnace, or other means known in the art to characterize the foaming of the slag. Such a characterization is referred to as the "foaming index" and indicates the degree of slag foaming so that the composition and feed rate of added materials may be adjusted in response to the index. As noted, the foaming index may be obtained by measurement of the amount of acoustic or vibrational energy within or around the electric arc furnace, or by monitoring or observing the electrical parameters associated with the electric arc generation.

The process information for a particular heat, 40, is accessed via and/or derived from the communications network or "Data Highway" of the steel plant, or the PLCs in the plant, or other means of electronic access. The process information may include the steel grade, the chemistry of the charged materials, the batch or heat number, the historical data regarding slag generation under similar conditions, and the like.

The oxygen injection location 50 represents the available gaseous oxygen that can be injected into the furnace body, as is known in the art. The material insertion vehicle 60 may be an injection lance by which solid materials A, B, or C can be added to the furnace volume by a carrier gas, as is known in the art. Alternatively, any other means known in the art can be used to introduce materials A, B, or C to the slag within the furnace.

As will be apparent to those skilled in the art, the slag composition of this invention is preferably formed in situ, as materials A, B, and C are added to the steelmaking slag. Thus composition thus formed in situ is a slag composition comprised of from about 85 to about 99 weight percent of steelmaking slag and from about 1 to about 15 weight percent of a foaming additive. The foaming additive is comprised of from about 20 to about 80 weight percent of a source of elemental carbon, from about 5 to about 80 weight percent of calcium carbide, and from about 25 to about 75 weight percent of an oxide compound. The weight/weight ratio of the source of elemental carbon/calcium carbide is at least 4.

The aforementioned slag composition exists initially when the materials A, B, and C are initially added. As will be apparent, after such addition, the composition changes due to reaction and/or degradation of the components A, B, and C.

In one preferred embodiment, the in situ slag composition initially contains at least 40 weight percent of a source of elemental carbon, by total weight of carbon source, calcium carbide, and oxide material.

The in situ slag composition of this invention preferably is at a temperature of from about 2300 to about 3100 degrees Fahrenheit. At this temperature, some of the materials in the slag or in solid form, and some are in liquid form. The ratio of solids/liquid in the slag composition ranges from 0.05/1 to about to 0.5/1.

Materials A, B, and C, as represented pictorially via hoppers 70, 72 and 74, respectively, are the reagent mixtures for slag foaming. These materials may be actual or figurative representations, as the individual components that make up a given mixture may be present in individual dispensers and co-injected or added mutually (concurrently) to the furnace. Material A is, for example, comprised of a source of elemental carbon (carbon, petroleum coke, graphite, coal, lignite, anthracite, coke, metal carbides, and mixtures thereof) and a low melting point material (mill scale, recycled electric arc furnace slag, glass, by-product amorphous oxides, slags, iron ore, baghouse dust, and mixtures thereof). Material B is comprised of a carbon source (carbon, petroleum coke, graphite, coal, lignite, anthracite, coke, metal carbides, and mixtures thereof) and a material that reacts endothermically within the slag and concurrently increases slag basicity (calcium carbide, dolomite, lime, dolomitic limestone, limestone, and mixtures thereof). An similarly, Material C is comprised of a carbon source (carbon, petroleum coke, graphite, coal, lignite, anthracite, coke, metal carbides, and mixtures thereof) and calcium carbide and a source of lime.

In one embodiment, the in situ composition of the invention is comprised of from about 20 to about 80 weight percent of such source of elemental carbon, by weight of such carbon, the calcium carbide, and the oxide material. In one embodiment, it is preferred that such composition be comprised of at least about 50 weight percent of such source of elemental carbon.

The preferred in situ composition of this invention also is comprised of from about 5 to about 80 weight percent of calcium carbide, by weight of carbon source, carbon, and metal oxide, provided that the weight/weight ratio of the source of elemental carbon/calcium carbide is at least 4.

As mentioned, Materials A, B, and C themselves may be added by blending materials from individual constituent containers (not shown). For example, one method of accomplishing the required additions is to have a source of carbon in a first container, a source of calcium carbide in a second container, a source of low melting point oxide in a third container, and a source of basic endothermically reacting material such as dolomite in a fourth container.

In one embodiment, the metal oxide compound(s) have a melting point of less than about 2,700 degrees Fahrenheit. In another embodiment, the metal oxide compound(s) have a melting point of greater than about 3,100 degrees Fahrenheit.

The process of the invention for a given batch of steel thus proceeds in accordance with the following general steps:

Step 1. The process information 40 is gathered by the Process Controller 30 and the melt-in slag chemistry is automatically forecast. The chemistry and rate of injection for the initial slag foaming phase is calculated, thus defining material A in hopper 70. The progress of the melting process and the foaming index is monitored in real time by the Process Controller.

Step 2. At a time when the melting has progressed to a level where sufficient liquid pool exists to create a foamy slag, material A is introduced to the furnace concurrently with oxygen at rates determined by the Process Controller 30. Slag foaming measurement is continuously input to the Process Controller and the material A feed rate, via material insertion vehicle 60, is adjusted accordingly (more material to increase slag foaming, less material to decrease slag foaming).

Step 3. At a time when foamy slag has been stabilized and melting has progressed sufficiently, as determined by the Process Controller, material A is no longer fed to the furnace. Material B is fed to the furnace in response to decreasing foaming index. Again, slag foaming measurement is input continuously to the Process Controller and the Material B feed rate is adjusted up if the foaming rate is insufficient or vice versa.

Step 4. After all the steel is melted into the furnace, and the end of the electric arc furnace melting cycle is near, Material B is no longer fed to the furnace. Material C is then fed to the furnace in response to decreasing foaming index. Again, slag foaming measurement is input continuously to the Process Controller and the material C feed rate is adjusted up if the foaming rate is insufficient or down if the foaming rate is too high. After the electric arc is turned off, additional material C may be fed to the furnace to reduce iron oxide content of the slag, and to increase slag viscosity just prior to tapping. In this way, iron yield is increased, and the cost of ladle slag reducing agents is decreased.

A mixture containing slag fluidizer and foaming agents is first injected to create a foamy slag early in the steel melting process. A low cost mixture of primarily a carbon source is then injected for the mid portion of the melting process. Near the end of the melting process, as the iron oxide content of the slag increases and slag foaming requires increasingly higher rates of injection of carbon materials, a calcium carbide containing blend of foaming agents is injected. Optionally, sources of carbonates or oxides of magnesium or calcium are also included in this injected foaming agent. While various mixtures may be used, it is possible to use a co-injection process whereby the carbon source is co-injected with the required amount of a) calcium or magnesium source, b) slag fluidizing source, and c) calcium carbide. Any variation or combination of the mixtures and co-injected materials can be used to achieve the desired result of optimal slag foaming agent for a given time and requirement.

The following Table 1 shows examples of compositions that may be used to synthesize slag foaming reagent. All amounts are expressed as percents in the specification, tables and claims are in wt % unless otherwise specified.

TABLE 1

COMPOSITIONS FOR LADLE SLAG SYNTHESIS AND TREATING LADLE SLAGS

| | Range (%) |
|---|---|
| CALCIUM CARBIDE | 5–80 |
| CARBON SOURCE | 20–80 |
| CALCIUM OXIDE | 0–30 |
| CALCIUM CARBONATE | 0–30 |
| MAGNESIUM OXIDE | 0–30 |
| MAGNESIUM CARBONATE | 0–30 |
| COMPLEX LOW-MELTING OXIDE | 0–30 |
| BAGHOUSE DUST | 0–10 |
| RECYCLED STEELMAKING SLAG | 0–50 |
| BY-PRODUCT SLAGS OR OXIDES | 0–40 |
| IRON ORE FINES | 0–50 |
| MILL SCALE | 0–50 |

Depending on the stage of the process and the indigenous slag sources, various mixtures are optimal for slag foaming. Table 2 (below) shows examples of compositions that may be used for slag foaming at various stages of the process.

TABLE 2

EXAMPLE COMPOSITIONS FOR SLAG FOAMING

| | Composition |
|---|---|
| 1. Blend for early foaming | 70% carbon material |
| | 20% complex low-melting oxide |
| | 10% by-product slag |
| 2. Blend for flat bath, low FeO | 80% carbon material |
| | 20% steelmaking slag |
| 3. Blend for flat bath, high FeO | 20% calcium carbide |
| | 60% carbon material |
| | 20% dolomitic limestone |
| 4. Blend for use prior to tap | 60% calcium carbide |
| | 20% carbon material |
| | 10% calcium oxide source |
| | 10% magnesium oxide source |

EXAMPLE

A 150 ton batch of steel is melted in an electric arc furnace. The scrap charged is low in residual elements and gangue materials. The steel is to be tapped from the furnace with an oxygen content of around 800 parts per million (ppm). Three injectable slag foaming materials are available: Material A contains granular carbon mixture, Material B contains approximately 50% steel making slag and 50% glass both in granular form, and Material C contains approximately 30% calcium carbide and 70% dolomitic limestone. Soon after the melting cycle begins, when a liquid pool is visible and there is access to it by the injection mechanism, Material A is co-injected with Material B in a ratio of about 2:1 at a combined rate of 100 lb. per minute. Oxygen is also injected into the furnace at this time. The total power on time in the furnace is 40 minutes. After about 10 minutes, the primary power curves indicate that a foamy slag has been achieved within the furnace. Material A is further injected but the co-injection of Material B is discontinued. At a time around 30 minutes into the process, the primary power curves indicate that slag foaming in the furnace is diminishing. At that time, material C is co-injected with material A at a ratio of about 1:3. The primary power curves once again indicate successful slag foaming. The ratio of material A to C is altered to about 1:4. After power is turned off, the injection of Material A is discontinued, but Material C is injected for a further 30 seconds at a rate of about 400 lb per minute. After sampling, the steel is tapped into the ladle.

EXAMPLE 2

A 150 ton batch of steel is melted in an electric arc furnace. The scrap charged is low in residual elements and gangue materials. The steel is to be tapped from the furnace with an oxygen content of around 800 ppm. Two injectable slag foaming materials are available Material A contains approximately 70% carbon 10% calcium carbide and 20% steelmaking slag, and Material B contains approximately 70% carbon, 10% dolomite and 20% calcium carbide. Soon after the melting cycle begins, when a liquid pool is visible and there is access to it by the injection mechanism, Material A is injected into the furnace at a rate of 100 lb. per minute. Oxygen is also injected into the furnace at this time. The total power on time in the furnace is 40 minutes. After about 20 minutes, Material A injection is discontinued and Material B is injected into the furnace at a rate of 200 lb per minute. After power is turned off, the injection is discontinued, and the steel is sampled and then tapped into the ladle.

One disadvantage of injected carbon or carbonaceous materials as slag foaming agents is that they are not efficient. Calcium carbide is a more efficient source of carbon for slag foaming, since its reaction rate is slower and it is better wetted by steelmaking slag. A disadvantage of calcium carbide is that it is several times the price of injectable carbon at the time of this disclosure. Accordingly, the present invention enables the use of an optimal blend of calcium carbide and carbon that not only proves to be cost effective but also increases foaming efficiency. Furthermore, calcium carbide is a source of calcium which can reduce the iron oxide content of the slag, thereby improving steel yield. The released calcium can also be effective in sulfur and phosphorus removal. These effects make it particularly attractive to use a higher fraction of calcium carbide near the end of the steel making process just prior to tapping.

In recapitulation, the present invention is directed to a composition, and method and system for achieving the composition, of an appropriate foaming slag for steel melting in the electric arc furnace, and more particularly to a system, method and composition for optimally foaming the slag on top of the steel in the melting furnace at least overall cost by injecting an optimum blend of foaming and slag forming materials into the furnace.

It is, therefore, apparent that there has been provided, in accordance with the present invention, a composition, method and apparatus for optimal slag formation in steel making. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A slag composition comprised of from about 85 to about 99 weight percent of steelmaking slag and from about 1 to about 15 weight percent of a foaming additive (by total weight of foaming additive and slag), wherein:
   (a) said steelmaking slag is at a temperature of from about 2500 to about 3100 degrees Fahrenheit,
   (b) said foaming additive is comprised of from about 20 to about 80 weight percent of a source of elemental carbon, from about 5 to about 80 weight percent of calcium carbide, and from about 25 to about 75 weight percent of an oxide compound, wherein the weight ratio of said source of elemental carbon to said calcium carbide is at least 2.

2. The slag composition as recited in claim 1, wherein said oxide compound is selected from the group consisting of lime, dolomite, dolimitic limestone, limestone, glass, by product slag, steelmaking slag, ferric oxide, mill scale, baghouse dust, and mixtures thereof.

3. The composition as recited in claim 2 wherein said carbon source is selected from the group consisting of carbon, petroleum coke, graphite, coal, lignite, anthracite, coke, and mixtures thereof.

4. A method of forming foam in the slag produced during electric arc furnace steelmaking, comprising the step of adding to slag at a temperature of from about 2500 to about 3100 degrees Fahreheit from about 1 to about 15 weight percent of a source of elemental carbon, calcium carbide, and a metal oxide compound, wherein:

(a) from about from about 20 to about 80 weight percent of said source of elemental carbon (by total weight of elemental carbon, calcium carbide, and metal oxide compound), from about 5 to about 80 weight of said calcium carbide (by total weight of elemental carbon, calcium carbide, and metal oxide compound), and from about 25 to about 75 weight percent of said oxide compound (by total weight of said elemental carbon, calcium carbide, and metal oxide compound) are added to said slag.

5. The process as recited in claim 4, wherein a mixture of said source of elemental carbon and said metal oxide compound are added to said slag.

6. The process as recited in claim 4, wherein a mixture of said source of elemental carbon and said calcium carbide are added to said slag.

7. The process as recited in claim 4, wherein a mixture of said calcium carbide and said metal oxide compound are added to said slag.

8. The process as recited in claim 4, further comprising the step of measuring the foaming index of said slag.

9. The process as recited in claim 4, wherein said source of elemental carbon, said calcium carbide, and said metal oxide compound, prior to the time it is added to said steelmaking slag, is a solid material with an average particle size of from about 1 to about 20 millimeters.

10. The process as recited in claim 4, wherein said metal oxide compound has a melting point of less than about 2,800 degrees Fahrenheit.

11. The process as recited in claim 10, wherein said metal oxide compound is selected from the group consisting of mill scale, recycled electric arc furnace slag, glass, by-product amorphous oxides, slags, iron ore, baghouse dust, and mixtures thereof.

12. The process as recited in claim 4, wherein said metal oxide has a melting point greater than about 3,100 degrees Fahrenheit.

13. The process as recited in claim 12, wherein said metal oxide is selected from the group consisting of lime, dolomite, limestone, dolomitic limestone, and mixtures thereof.

* * * * *